A. SOPER.
Grain-Driers.

No. 144,710.    Patented Nov. 18, 1873.

Witnesses
Benj. Clark
Wm Edwards

Inventor
Asahel Soper
By J.P. Fitch
his atty.

UNITED STATES PATENT OFFICE.

ASAHEL SOPER, OF NEW YORK, N. Y.

IMPROVEMENT IN GRAIN-DRIERS.

Specification forming part of Letters Patent No. 144,710, dated November 18, 1873; application filed October 20, 1873.

*To all whom it may concern:*

Be it known that I, ASAHEL SOPER, of the city, county, and State of New York, have invented an Improvement in Grain-Driers, of which the following is a specification, reference being had to the accompanying drawings forming part thereof.

Figure 1:
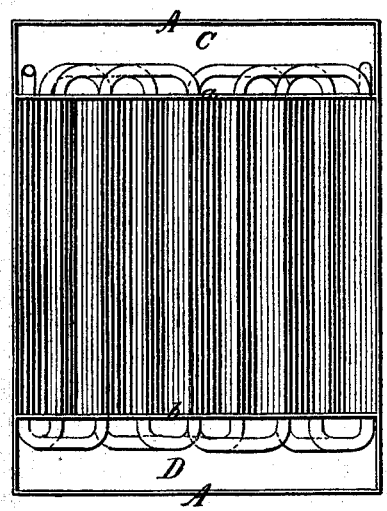
Figure 2:
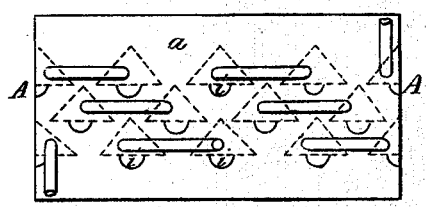
Figure 3:
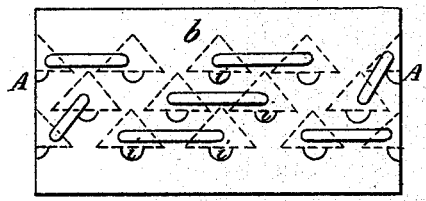
Figure 4:
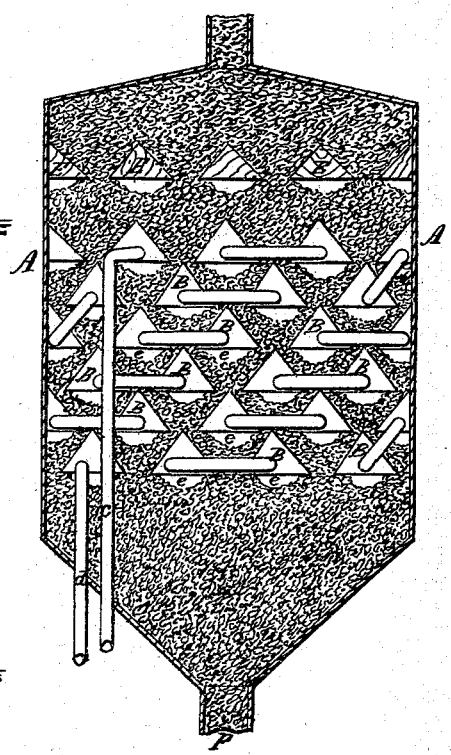

Figure 1 is a plan of a grain-drier embodying my invention. Fig. 2 is an end view of the same. Fig. 3 is a view of the opposite end. Fig. 4 is a vertical section of the same filled with grain, the steam-pipes, however, being seen as in end view.

My invention consists in the combination, with a large number of triangular steam-pipes in a suitable inclosure, of exhaust-chambers at the ends of the pipes, with openings into the said chambers from the spaces below the pipes, the air in said spaces being preferably exhausted by an exhaust-fan or its equivalent, the whole being so constructed and arranged that the grain falling down through the inclosure will pass in a zigzag direction over a series of heated inclined planes, formed of the walls of the said triangular steam-pipes, and the moisture of the grain, as it is evaporated, will be drawn into the said exhaust-chambers through said openings.

A is the inclosure, tank, or body of the drier. B represents several lines or series of triangular steam-pipes arranged one above another, those of each line or horizontal series being placed intermediate those of the next, upper and lower series, and each being placed with one of its angles pointing directly upward, as shown in Figs. 2, 3, and 4, the apex of each pipe extending, preferably, a little above the line of the bases of those next above it. They thus constitute a series of inclined planes, over which the grain, in falling through the drier, will pass in zigzag directions. These pipes are closed at both ends, and are fixed in the partitions *a* and *b*. These partitions divide the interior of the drier into three chambers, the middle chamber being occupied by the steam-pipes B and the grain when in operation, and the two end chambers C and D being vacant to receive the moisture from the grain when vaporized by the heat of the pipes B. They are closed at the top and bottom, and preferably a pipe is to lead from each to an exhaust air-pump or fan, or equivalent, (not shown,) whereby the air may be exhausted from the said chambers. The said triangular pipes are to be heated by the introduction into them of steam, or equivalent, and preferably by the arrangement shown in the drawings, in which *c* is a steam-conductor, leading from a steam-generator (not shown) into one of the upper series of pipes B. From the opposite end of this pipe B, a steam-conductor leads into the adjacent pipe of the series, at the opposite end of which is a conductor leading into the next adjacent pipe of the series, and so on throughout the entire of the several series, forming a continuous channel for the steam from the induction-conductor back and forth through the pipes B, and out through the eduction-conductor *d;* or the steam may, if preferred, be sent through the series in the reverse direction, the object being to heat the entire series. E represents several triangular bars, which may be of wood, placed over the steam-pipes B, to relieve in some degree the pressure of the grain upon the latter. They may be used, if desired.

The operation of my drier is as follows: The body or tank A being filled with grain, steam is let into the pipes B. The grain, as it naturally flows down over the inclined planes formed by the said pipes, will not entirely fill the spaces immediately underneath the bases of the said pipes, leaving vacant spaces *e*, as seen in Fig. 4. Immediately opposite these vacant spaces, apertures *i* are made through the partitions *a* and *b*, through which the moisture, when vaporized by the heat of the pipe B, may pass out into the exhaust-chambers C D. No air being allowed to enter the drier, except what passes in with the grain, the temperature of the entire interior of the drier and its contents is quickly raised to that of the steam in the pipes, which may, of course, be any degree desired capable of being imparted by steam. The air being in some measure exhausted from the chambers C and D by the action of an exhaust pump or fan, thereby forming a partial vacuum in the said chambers, the vapor in the grain, as quickly as formed, will rush through the openings *e* into these chambers, and thence out through the fan.

The movement of the grain down through the drier, over the heated inclined planes, may be regulated by a valve, F, at the bottom, whereby the grain may be held under the action of the heat of the planes until complete desiccation takes place. The arrangement of the heated planes, as described, causes a reversal of the stratums of grain as they pass from one plane to the next below, bringing all parts of the mass into contact with the heated surfaces in its progress through the heater.

I am aware that series of double-inclined planes or tables, alternating in position with each other, have been arranged in grain-driers, so that the grain is caused to take a zigzag course down through the drier, substantially as shown herein and described; also, that openings have been made in the walls of a grain-drier, through which the vapor from the heated grain is allowed to pass out from the grain into flues on either side of the body of the drier; also, that heat has been communicated to the grain in a drier by pipes heated by steam penetrating or passing through the grain, and that such heating-pipes have been used in connection with double-inclined tables separate from such pipes in the body of the drier, these several devices being shown in the following-named United States patents: Patents Nos. 121,588 and 110,896, issued to Lewis S. Chichester, and Patent No. 112,118, issued to John Buckingham.

I do not claim any of the said devices or arrangements, intending to limit my claim here to the special devices and their arrangement shown and described, consisting of the angular steam-pipes B, which serve the double purpose of conveying heat to the grain and of inclined tables or planes, the ventilating-apertures e, and the exhaust-chambers C D, combined and operating as described.

What I claim as my invention, and desire to secure by Letters Patent, is—

The combination, in a grain-drier, of a large number of triangular steam-pipes, B, constructed and arranged as described, with the exhaust-chambers C D and the apertures e through the walls a b immediately underneath the bases of the said steam-pipes, all constructed, arranged, and operating substantially as and for the purpose specified.

ASAHEL SOPER.

Witnesses:
B. S. CLARK,
WM. G. BUSSEY.